US008665548B2

(12) United States Patent
Hirata et al.

(10) Patent No.: US 8,665,548 B2
(45) Date of Patent: Mar. 4, 2014

(54) MAGNETIC RECORDING DEVICE AND MAGNETIC RECORDING METHOD

(75) Inventors: Kei Hirata, Tokyo (JP); Hiroshi Kiyono, Tokyo (JP); Osamu Nakada, Tokyo (JP); Kenkichi Anagawa, Tokyo (JP)

(73) Assignee: TDK Corporation, Tokyo (JP)

( * ) Notice: Subject to any disclaimer, the term of this patent is extended or adjusted under 35 U.S.C. 154(b) by 387 days.

(21) Appl. No.: 13/047,304

(22) Filed: Mar. 14, 2011

(65) Prior Publication Data

US 2012/0236431 A1   Sep. 20, 2012

(51) Int. Cl.
*G11B 21/02*   (2006.01)

(52) U.S. Cl.
USPC .......................................... 360/75

(58) Field of Classification Search
None
See application file for complete search history.

(56) References Cited

U.S. PATENT DOCUMENTS

| | | | |
|---|---|---|---|
| 6,696,832 B2 * | 2/2004 | Chew et al. ............... | 324/210 |
| 6,707,643 B2 | 3/2004 | Takeo et al. | |
| 7,019,943 B2 | 3/2006 | Sato | |
| 7,394,607 B2 | 7/2008 | Ohno et al. | |
| 7,486,460 B2 | 2/2009 | Tsuchinaga et al. | |
| 7,649,707 B2 * | 1/2010 | Saliba ........................ | 360/75 |
| 8,189,294 B2 * | 5/2012 | Edelman et al. .......... | 360/125.3 |
| 8,339,734 B2 * | 12/2012 | Pentek et al. ............. | 360/119.03 |
| 2004/0212923 A1 | 10/2004 | Taguchi | |
| 2005/0237665 A1 | 10/2005 | Guan et al. | |
| 2010/0033865 A1 | 2/2010 | Hashimoto et al. | |

FOREIGN PATENT DOCUMENTS

| | | |
|---|---|---|
| JP | A 2002-100007 | 4/2002 |
| JP | A 2004-22004 | 1/2004 |
| JP | A 2004-326990 | 11/2004 |
| JP | A 2005-310363 | 11/2005 |
| JP | A 2006-294162 | 10/2006 |
| JP | A 2007-73138 | 3/2007 |
| JP | A 2010-40113 | 2/2010 |

OTHER PUBLICATIONS

U.S. Appl. No. 12/801,540, filed Jun. 14, 2010 in the name of Hirata at al.
Kanai et al., "Finite-Element and Micromagnetic Modeling of Write Heads for Shingled Recording," IEEE Transactions on Magnetics, vol. 46, No. 3, Mar. 2010, pp. 715-721.

* cited by examiner

*Primary Examiner* — K. Wong
(74) *Attorney, Agent, or Firm* — Oliff PLC

(57) ABSTRACT

A magnetic disk device includes: a recording medium provided with a plurality of write tracks; a magnetic write head including a magnetic pole, side shields, and a leading shield, a distance from the magnetic pole to each of the side shields being maintained to be uniform with a gap layer therebetween, and a distance from the magnetic pole to the leading shield being maintained to be uniform with a gap layer therebetween; and a control section rotating the recording medium, and allowing magnetic information to be recorded on the recording medium while allowing the magnetic write head to travel in a direction from an inner write track toward an outer write track or in a direction from the outer write track toward the inner write track, across write tracks in the recording medium. With such a configuration, format efficiency may be improved, and a width of an erase band on a magnetic disk may be minimized. Therefore, surface recording density of a recording medium may be improved without reducing an effective write track width.

5 Claims, 14 Drawing Sheets

MAGNETIC RECORDING DEVICE AND MAGNETIC RECORDING METHOD

BACKGROUND OF THE INVENTION

1. Field of the Invention

The present invention relates to a magnetic recording device and a magnetic recording method.

2. Description of Related Art

Recently, with increasing surface recording density of a magnetic recording medium (hereinafter, referred to as a "recording medium") typified by a hard disk, performance improvement of a magnetic write head is demanded. Accordingly, as a recording method with the magnetic write head, a vertical magnetic recording method in which a direction of signal magnetic field is set in a direction intersecting with a plane of a magnetic recording medium is attracted attention, instead of a longitudinal magnetic recording method in which a direction of signal magnetic field is set in an in-plane direction of a recording medium. This is because in the vertical magnetic recording method, linear recording density is increased, and an advantage that a recorded recording medium is hardly affected from thermal fluctuation is obtainable.

A magnetic write head of the vertical magnetic recording method (hereinafter, referred to as a "vertical magnetic write head") includes a thin film coil for generating magnetic flux, and a main magnetic-pole layer guiding the magnetic flux, which is generated in the thin film coil, to a magnetic recording medium. The main magnetic-pole layer includes a front end portion (a magnetic pole) with a minimal width generating magnetic field for recording (recording magnetic field).

As for the configuration of the vertical magnetic write head, it has been studied that to suppress spread of recording magnetic field and to realize a high-density recording, side shield layers are provided on both sides of a magnetic pole in a direction across write tracks through a gap (for example, refer to Japanese Unexamined Patent Application Publication Nos. 2004-326990, 2004-022004, and 2005-310363).

In recent years, demand on the improvement in surface recording density of the magnetic recording medium tends to increase. Under the circumstances, new magnetic recording method called shingle write method has been proposed (for example, refer to Japanese Unexamined Patent Application Publication Nos. 2006-294162, 2007-73138, and 2010-40113). In the shingle write method, a part of a magnetic write track is overwritten (recording of a subsequent magnetic write track is performed so that some regions of a previously-recorded magnetic write track is overwritten). Accordingly, the width of the magnetic write track eventually obtained may be narrower than the width of a trailing edge of a magnetic pole, and improvement of the surface recording density of the magnetic recording medium is achievable. However, due to such characteristics, except for a final write track, performing data rewriting processing in only an arbitrary unit recording region is physically difficult. Therefore, all magnetic write tracks including magnetic write tracks not essentially requiring rewriting are subjected to recording processing. Accordingly, compared with a typical recording method, processing time taken for data rewriting processing is increased. Therefore, a method in which a plurality of data recording blocks are provided on a magnetic write track, and data rewriting processing is performed for each recording block to reduce processing time for rewriting has been proposed. In this case, the plurality of data recording blocks are arranged so as not to overlap with one another.

Incidentally, in a region at both side ends of the magnetic write track recorded with magnetic data, through which a magnetic pole of the magnetic recording head passes, a erase band (a recording region with an unstable magnetization direction) is generated due to a phenomenon called write exudation. Specifically, when a tilt angle (skew angle) of a main magnetic-pole layer with respect to a tangent direction (a rotation direction of the magnetic disk, or a movement direction of the main magnetic-pole layer) of the write track is large, (although a bevel angle is provided) a relatively large erase band is generated. Therefore, the distance between adjacent write tracks (track pitch) needs to be widened depending on the size of the skew angle so that an effective write track width after recording is a width capable of being read by the magnetic read head. However, when the track pitch is widened, error such as miswriting is avoidable, but the reduction of the surface recording density of the magnetic recording medium inevitably arises.

From such circumstances, a magnetic recording device and a magnetic recording method which have a simple configuration and are capable of responding high-density recording while preventing errors from occurring at information recording processing, are strongly desired.

SUMMARY OF THE INVENTION

A magnetic recording device according to an embodiment of the invention includes: a recording medium provided with a plurality of write tracks; a magnetic write head including a magnetic pole, side shields, and a leading shield, a distance from the magnetic pole to each of the side shields being maintained to be uniform with a gap layer therebetween, and a distance from the magnetic pole to the leading shield being maintained to be uniform with a gap layer therebetween; and a control section rotating the recording medium, and allowing magnetic information to be recorded on the recording medium while allowing the magnetic write head to travel in a direction from an inner write track toward an outer write track or in a direction from an outer write track toward an inner write track, across write tracks in the recording medium.

A magnetic recording method according to an embodiment of the invention includes: a first step of rotating a magnetic recording medium provided with a plurality of write tracks; and a second step of recording information on a desired write track of the write tracks through allowing a magnetic write head to float over the magnetic recording medium and applying a recording magnetic field from the magnetic pole to the desired write track, the magnetic write head including a magnetic pole, side shields, and a leading shield, a distance from the magnetic pole to each of the side shields being maintained to be uniform with a gap layer therebetween, and a distance from the magnetic pole to the leading shield being maintained to be uniform with a gap layer therebetween. In the second step, magnetic information is recorded on the recording medium while allowing the magnetic write head to travel in a direction from an inner write track toward an outer write track or in a direction from an outer write track toward an outer write track, across write tracks in the recording medium.

In the magnetic recording device and the magnetic recording method according to the embodiments of the invention, when magnetic information is recorded on a recording medium, the magnetic write head is allowed to travel in a certain direction with respect to the recording medium. Therefore, format efficiency may be improved. Moreover, in the magnetic write head, the distance between the magnetic pole, the side shield, and the leading shield is maintained uniform with the gap layer therebetween. Therefore, the width of the erase band on the magnetic disk may be minimized, and surface recording density of the magnetic medium may be improved without reducing an effective write track width.

In the magnetic recording device and the magnetic recording method according to the embodiments of the invention, magnetic information is recorded on the recording medium while the magnetic write head is allowed to travel in a direction from an outer write track toward an inner write track so that higher recording efficiency is obtainable. This is because linear recording density of an outer write track is higher than that of an inner write track, and therefore higher data transfer rate is obtainable. By using a write track in order from outer periphery, data access rate may be increased.

DETAILED DESCRIPTION OF THE PREFERRED EMBODIMENTS

Hereinafter, a preferred embodiment of the invention will be described in detail with reference to drawings.

[Configuration of Magnetic Disk Device]

First, referring to FIG. 1 and FIG. 2, a configuration of a magnetic disk device mounted with a magnetic read write head will be described.

Figure 1:
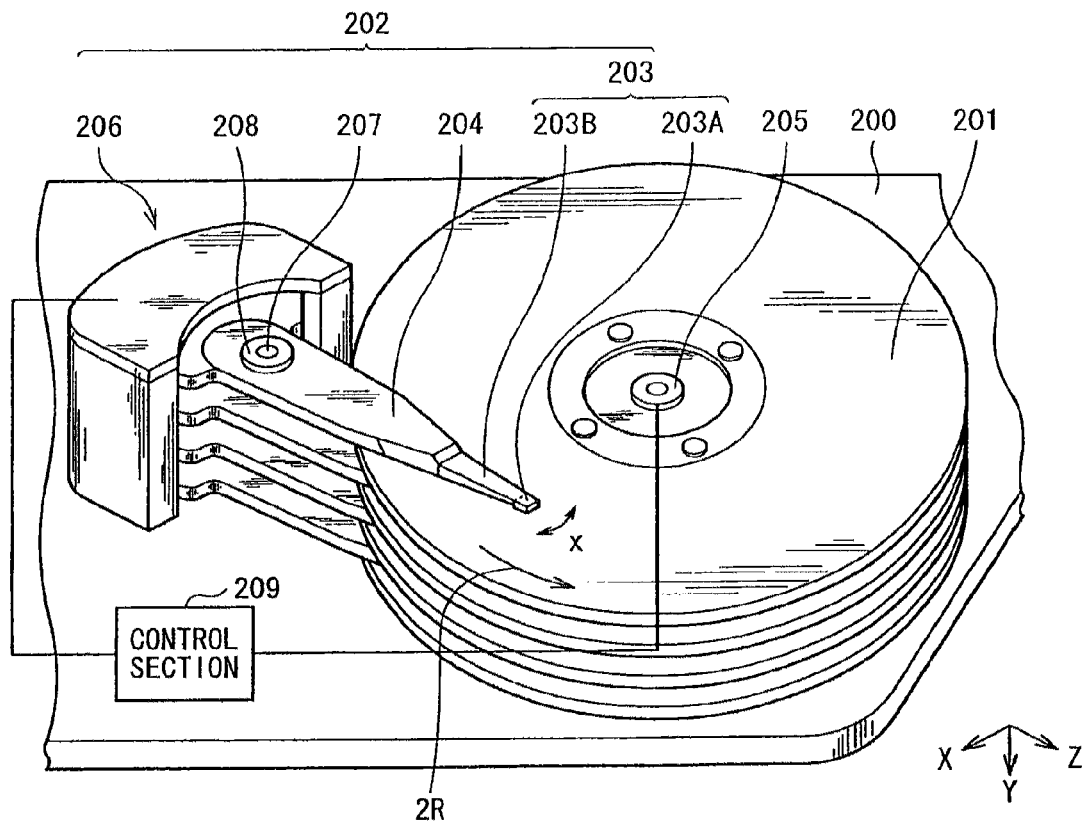
FIG. 1 is a perspective view illustrating a configuration of a magnetic disk device according to an embodiment of the invention.

FIG. 1 is a perspective view illustrating an internal configuration of a magnetic disk device as the embodiment. The magnetic disk device is a hard disk drive employing a shingle write method as a recording method and a load/unload method as a driving method. The magnetic disk device includes, for example, in a housing 200, a magnetic disk 201 as a magnetic recording medium in which information is to be recorded, and a head arm assembly (HAA) 202 for recording information on the magnetic disk 201 and reproducing the information. The HAA 202 is provided with a head gimbals assembly (HGA) 203, an arm 204 supporting a base of the HGA 203, and a driving section 206 as a power source for rotating the arm 204. The HGA 203 includes a magnetic head slider (hereinafter, simply referred to as a "slider") 203A having a side surface provided with a magnetic read write head 212 (described later) according to the embodiment, and a suspension 203B having an end provided with the slider 203A. The arm 204 supports the other end of the suspension 203B (an end opposite to the end provided with the slider 203A). The arm 204 is configured so as to be rotatable around a fixed shaft 207 fixed to the housing 200 through a bearing 208. The driving section 206 is configured by, for example, a voice coil motor, and a control section 209 controls operation of the driving section 206. The magnetic disk device has a plurality (four in FIG. 1) of magnetic disks 201, and the slider 203A is disposed corresponding to a recording surface (a front surface and a rear surface) of each of the magnetic disk 201. Each slider 203A is capable of moving in a direction crossing a write track, that is, in a track width direction (in X-axis direction) in a plane parallel to the recording surface of each magnetic disk 2. On the other hand, the magnetic disk 201 is configured to rotate around a spindle motor 205 fixed to the housing 200 in a rotation direction 2R substantially orthogonal to the X-axis direction. The control section 209 controls operation of the spindle motor 205. In FIG. 1, for the sake of facilitating visualization of internal configuration of the magnetic disk device, the housing 200 is partially cut and illustrated. Note that the detail configuration of the magnetic disk 201 will be described later.

Figure 2:
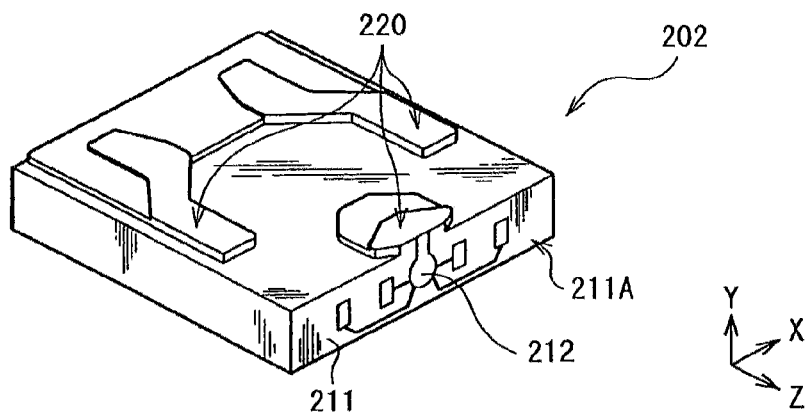
FIG. 2 is a perspective view illustrating a configuration of a main part of FIG. 1 in an enlarged manner.

As illustrated in FIG. 2, for example, the slider 203A includes a block-shaped substrate 211 composed of a non-magnetic insulating material such as AlTiC ($Al_2O_3$.TiC). One surface of the substrate 211 is an ABS 220 closely disposed to face a recording surface of the magnetic disk 201. The ABS 220 is, for example, provided with a concave/convex structure for reducing air resistance generated at rotation of the arm 204. A magnetic read write head 212 is formed on an element forming surface 211A that is a side surface orthogonal to the ABS 220. When the magnetic disk device is not driven, namely, when the spindle motor 205 stops and the magnetic disk 201 does not rotate, the slider 203A is pulled off to a position away from the magnetic disk 201 (unload state) in order to avoid contact between the ABS 220 and the recording surface. On the other hand, when the magnetic disk device is initiated, the magnetic disk 201 starts to rotate at a high speed by the spindle motor 205, and the arm 204 rotates around the fixed shaft 207 by the driving section 206. Therefore, the slider 203A moves above the surface of the magnetic disk 201, and is in a load state. The rotation of the magnetic disk 201 at a high speed leads to air flow between the recording surface and the ABS 220, and lift force caused by the air flow leads to a state where the slider 203A floats to maintain a certain distance (magnetic spacing) along a direction (Y-axis direction) orthogonal to the recording surface. Note that in FIG. 2, for the sake of facilitating visualization of the configuration of the slider 203A on the ABS 220 side, a state where the state illustrated in FIG. 1 is turned upside down is illustrated.

In the magnetic disk device, when recording operation or reproducing operation of information is performed, the magnetic disk 201 rotates at a high speed, and then the arm 204 rotates to move the slider 203A to a predetermined recording region in the magnetic disk 201. Then, when the magnetic read write head 212 is electrically conducted in a state of facing the magnetic disk 201, recording processing on the magnetic disk 201 or reproducing processing of the recorded information is performed by the magnetic read write head 212. In this case, the control section 209 allows the magnetic read write head 212 to record magnetic information, while allowing the magnetic read write head 212 to travel in a direction from an outer write track toward an inner write track.

[Configuration of Magnetic Read Write Head]

Figure 3:
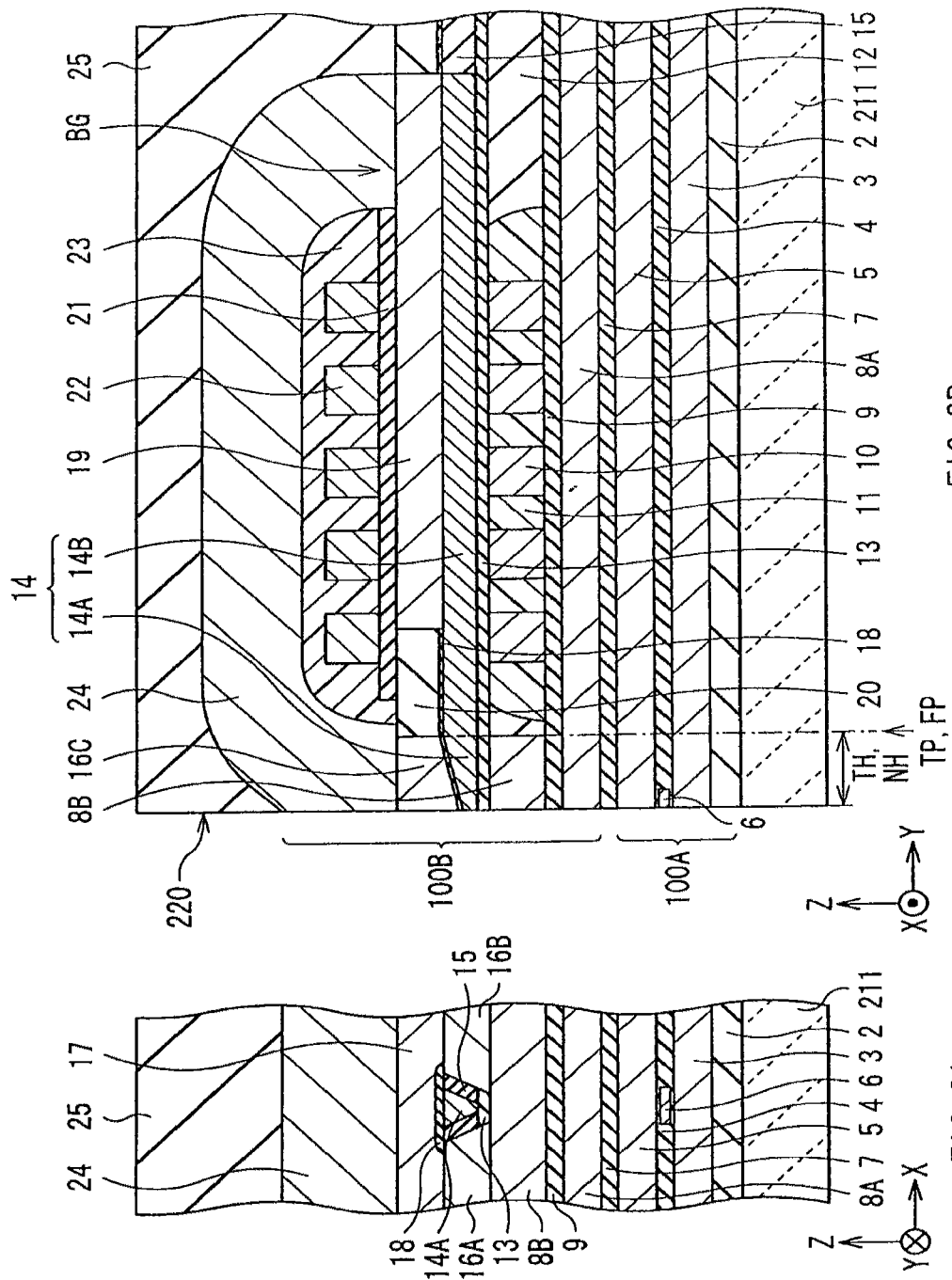
FIG. 3 is a sectional view illustrating a configuration of a magnetic read write head illustrated in FIG. 2.
Figure 4:
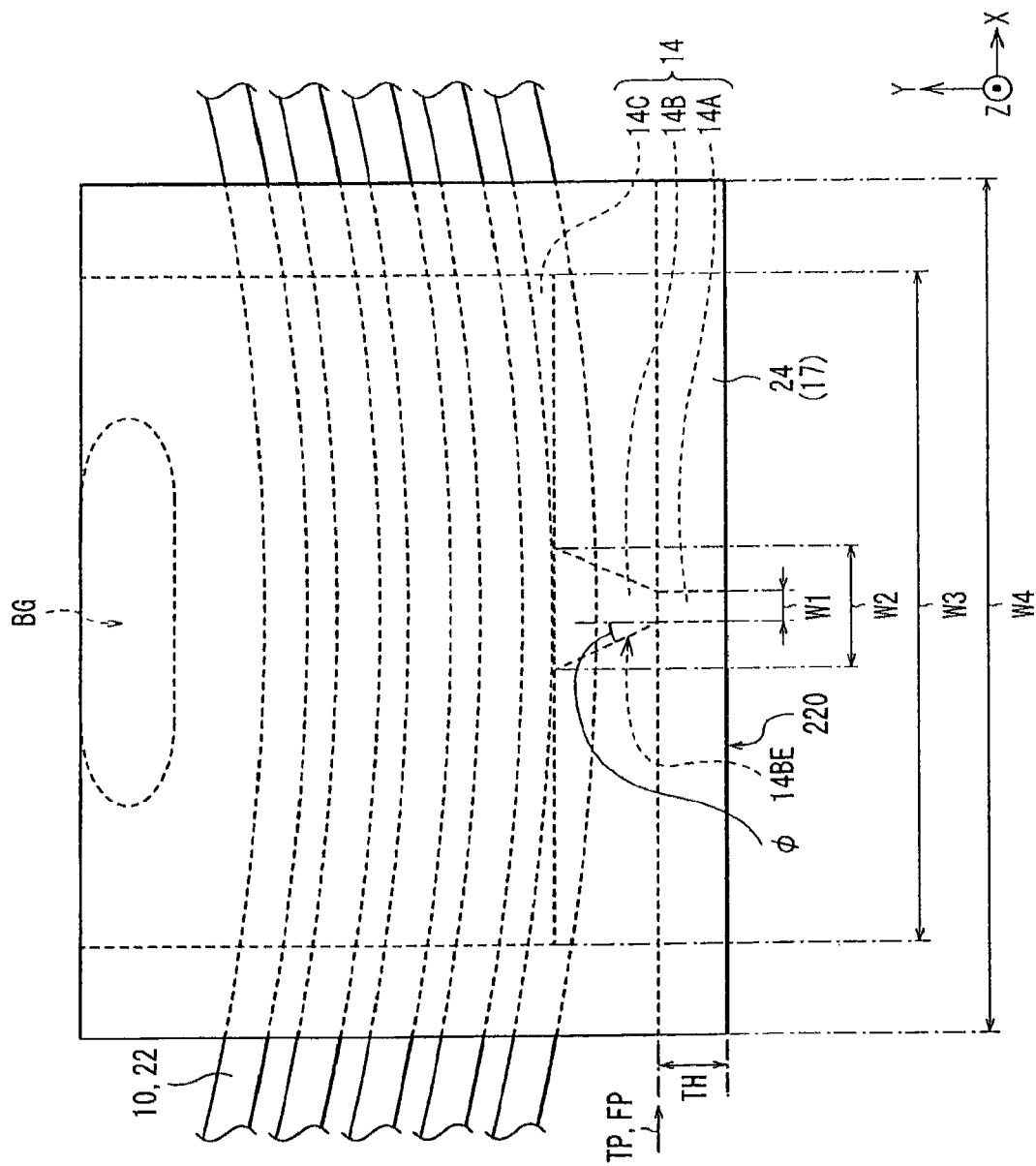
FIG. 4 is a plane view illustrating a configuration of a main part of the magnetic read write head illustrated in FIG. 2.
Figure 5:
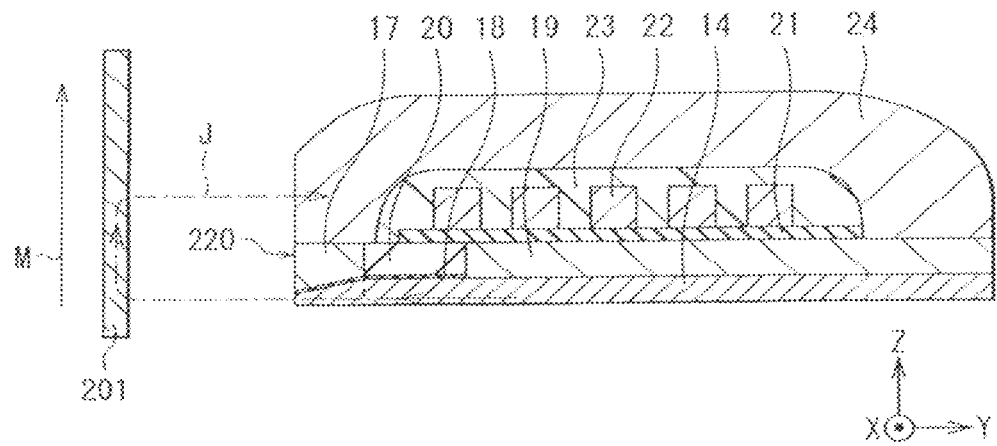
FIG. 5 is a sectional view for describing a relationship between the magnetic read write head illustrated in FIG. 2 and a magnetic disk.

FIG. 3 to FIG. 5 illustrate a configuration of the magnetic read write head 212 illustrated in FIG. 2. Specifically, FIG. 3 illustrates a configuration of an entire cross-sectional surface, FIG. 4 illustrates a plane configuration of the main part, and FIG. 5 is for describing a relationship between the magnetic read write head 212 and the magnetic disk 201. FIG. 3A illustrates a cross-sectional surface parallel to the ABS 220, and FIG. 3B illustrates a cross-sectional surface perpendicular to the ABS 220. Note that an up-pointing arrow M illustrated in FIG. 3 indicates a direction where the magnetic disk 201 moves relative to the magnetic read write head 212.

In the following description, dimension in X-axis direction, in Y-axis direction, and in Z-axis direction illustrated in FIG. 3 to FIG. 5 are "width", "length", and "thickness", respectively. In addition, the side closer to the ABS 220 and the side farther to the ABS 220 in Y-axis direction are "front side" and "rear side", respectively. Moreover, front side and rear side in a direction of the arrow M are "trailing side" and "leading side", respectively. These definitions are applied to FIG. 6 and the subsequent drawings which will be described later.

The magnetic read write head 212 performs magnetic processing on the magnetic disk 201, and is a combined head capable of performing reproducing processing and recording processing.

As illustrated in FIG. 3, for example, the magnetic read write head 212 is configured by stacking an insulating layer 2, a read head section 100A, a separation layer 7, a write head section 100B, and an over coat layer 25 in this order on the substrate 211, and includes the ABS 220 as a side surface common to these layers.

The insulating layer 2, the separation layer 7, and the over coat layer 25 are composed of a non-magnetic insulating material such as aluminum oxide. Examples of the aluminum oxide include alumina ($Al_2O_3$).

The read head section 100A performs reproducing processing by using magneto-resistive effect (MR). The read head section 100A is configured by stacking, for example, a lower lead shield 3, a shield gap 4, and an upper lead shield 5 in this order. A read element (an MR element 6) is embedded in the shield gap 4 so that an end surface of the read element is exposed to the ABS 220.

The lower lead shield 3 and the upper lead shield 5 magnetically separates the MR element 6 from other nearby devices, and extend backward from the ABS 220. The lower lead shield 3 is composed of a magnetic material such as nickel iron alloy (NiFe). As the nickel iron alloy, for example, Permalloy (trade name) in which the content of nickel is 80 wt % and the content of iron is 20 wt % is cited. The upper lead shield 5 is composed of a magnetic material such as Permalloy. Incidentally, the lower lead shield 3 and the upper lead shield 5 may have a single-layer structure, or may have a multi-layer structure in which a pair of magnetic layers (made of a magnetic material such as Permalloy) sandwich a non-magnetic layer (made of a non-magnetic conductive material such as ruthenium (Ru) or non-magnetic insulating material such as alumina).

The shield gap 4 electrically separates the MR element 6 from other nearby devices, and is composed of a non-magnetic insulating material such as alumina. The MR element 6 uses giant magneto-resistive effect (GMR) or tunneling magneto-resistive effect (TMR).

The write head section 100B is a vertical magnetic write head performing recording processing of a vertical magnetic recording method. The write head section 100B is configured by stacking, on the separation layer 7, for example, a magnetic layer 8A, an insulating layer 9, a thin film coil 10 embedded in insulating layers 11 to 13, a leading shield 8B having an end surface exposed to the ABS 220, a main magnetic-pole layer 14, a side gap 15 and a pair of side shields 16, a trailing shield 17, a trailing gap 18, an auxiliary magnetic-pole layer 19, an insulating layer 20, a thin film coil 22 embedded in insulating layers 21 and 23, and a return yoke layer 24 in this order.

The magnetic layer 8A functions as a return pass on a leading side, and is composed of a magnetic material such as NiFe and CoNiFe. The magnetic layer 8A disperses a part of recording magnetic field emitted from the main magnetic-pole layer 14 to the leading side so that wide adjacent track erase (WATE) effective magnetic field is reduced. The WATE effective magnetic field means effective magnetic field affecting adjacent tracks within a wide range (for example, two to ten tracks adjacent to a track to be written).

The thin film coil 10 mainly generates magnetic flux to suppress unintentional approach (leakage) of magnetic flux for recording, which is generated by the thin film coil 22, to the read head section 100A. The thin film coil 10 is composed of a high conductive material such as copper (Cu), and has a configuration (spiral configuration) winding around a back gap BG as illustrated in FIG. 3 and FIG. 4. Although the winding number (turn number) of the thin film coil 10 is not specifically limited, the winding number is preferably coincident with the turn number of the thin film coil 22.

The insulating layers 11 to 13 electrically separate the thin film coil 10 from other nearby devices. The insulating layer 11 is composed of a non-magnetic insulating material such as photoresist flowing at heating or spin on glass (SOG). The insulating layers 12 and 13 are composed of a non-magnetic insulating material such as alumina.

The main magnetic-pole layer 14 contains magnetic flux generated by the thin film coil 22, and emits the magnetic flux from the ABS 220 to generate recording magnetic field. The main magnetic-pole layer 14 extends backward from the ABS 220, and is composed of a magnetic material with high saturation flux density such as iron-based alloy. Examples of the iron-based alloy include iron cobalt alloy (FeCo) and iron cobalt nickel alloy (FeCoNi).

As illustrated in FIG. 4, for example, the main magnetic-pole layer 14 has a planar shape like a paddle which is used for rowing a boat. In other words, the main magnetic-pole layer 14 includes a front end portion 14A (first magnetic-pole layer portion), an intermediate portion 14B (second magnetic-pole layer portion), and a rear end portion 14C (third magnetic-pole layer portion), and has an integrated configuration in which the front end portion 14A, the intermediate portion 14B, and the rear end portion 14C are linked with one another. The front end portion 14A has a fixed width W1 (first width) defining a write track width, the intermediate portion 14B has a width that increases from the width W1 to a width W2 (second width; W2>W1) wider than the width W1, and the rear end portion 14C has a width W3 (third width; W3>W2) wider than the width W2. A position where the width of the main magnetic-pole layer 14 starts to increase from the front end portion 14A to the intermediate portion 14B, namely, a position where the width of the main magnetic-pole layer 14 starts to increase from the width W1 defining the write track width is a flare point FP that is one of important factors determining recording performance of the magnetic read write head. Note that FIG. 3 and FIG. 4 illustrate a case where a throat height zero position TP is coincident with the flare point FP.

The front end portion 14A is a portion substantially emitting magnetic flux for recording, which is generated by the thin film coil 22, to the magnetic disk 201, and extends in Y-axis direction so as to have the fixed width W1 over the entire portion.

The intermediate portion 14B is a portion supplying magnetic flux contained in the auxiliary magnetic-pole layer 19 to the front end portion 14A. The width of the intermediate portion 14B gradually increases from the width W1 to the width W2, namely, the intermediate portion 14B has the width W1 at a portion linked with the front end portion 14A, and has the width W2 at a portion linked with the rear end portion 14C. The expansion angle in the intermediate portion 14B, that is, an angle Φ between an extending direction (Y-axis direction) of the front end portion 14A and a side end 14BE of the intermediate portion 14B is equal to or larger than 30°, and is preferably within a range of approximately 40° to 50°.

The rear end portion 14C is a portion supplying magnetic flux contained in the auxiliary magnetic-pole layer 19 to the front end portion 14A, similar to the intermediate portion 14B. The rear end portion 14C extends in Y-axis direction so as to have the fixed width W3 over the entire portion. Particularly, the width W3 of the rear end portion 14C is, for example, coincident with the width of the auxiliary magnetic-pole layer 19, and is smaller than the width W4 (refer to FIG. 4) of the trailing shield 17 and of the return yoke layer 24 (W3<W4).

The main magnetic-pole layer 14 is surrounded by the insulating layer 9, the side gap (SG) 15, and the trailing gap 18, and is mutually separated from the leading shield 8B, the pair of side shields 16 (16A and 16B), and the trailing shield 17.

The side gap 15 magnetically separates the main magnetic-pole layer 14 from the pair of side shields 16 in the width direction (direction across write tracks=X-axis direction) (refer to FIG. 4 which will be described later). The side gap 15 is arranged between the main magnetic-pole layer 14 and the pair of side shields 16A and 16B, and is adjacent to both sides in the width direction of the main magnetic-pole layer 14 (hereinafter, simply referred to as "both sides").

The trailing gap 18 magnetically separates the main magnetic-pole layer 14 from the trailing shield 17 in a thickness direction (a direction intersecting with the direction across write tracks=Y-axis direction), and is also called a recording gap. The trailing gap 18 is arranged between the main magnetic-pole layer 14 and the trailing shield 17. Note that the side gap 15 and the trailing gap 18 are composed of a non-magnetic material such as alumina.

The leading shield 8B, the trailing shield 17, and the side shield 16 take in magnetic flux in the vicinity of the ABS 220 to prevent the magnetic flux from spreading. As a result, the gradient of the recording magnetic field is increased, the write track width is narrowed, and the magnetic field component in an oblique direction is accordingly included in the recording magnetic field. The leading shield 8B, the trailing shield 17, and the side shield 16 extend backward from the ABS 220. The trailing shield 17 and the side shield 16 are adjacent to the insulating layer 20 at the rear side, and plays a role to define the front-most end position (throat height zero position TP) of the insulating layer 20. The leading shield 8B, the trailing shield 17, and the side shield 16 are composed of a magnetic material same as that of the main magnetic-pole layer 14, and have a rectangular planar shape with the fixed width W3 larger than the width W2 as illustrated in FIG. 4. Incidentally, the detailed configuration in the vicinity of the main magnetic-pole layer 14 on the ABS 220 will be described later (refer to FIG. 6).

The auxiliary magnetic-pole layer 19 functions as an auxiliary magnetic-flux containing portion for supplying magnetic flux to the main magnetic-pole layer 14, and for example, may be composed of a magnetic material same as that of the main magnetic-pole layer 14, or may be composed of a different magnetic material. The auxiliary magnetic-pole layer 19 extends backward from a position recessed from the ABS 220 on the trailing side of the main magnetic-pole layer 14, and is linked with the main magnetic-pole layer 14. In addition, the auxiliary magnetic-pole layer 19 has a rectangular planar shape with the width W2, for example, as illustrated in FIG. 2.

The insulating layer 20 defines a throat height TH that is one of important factors determining recording property of the magnetic read write head, and is arranged between the auxiliary magnetic-pole layer 19, the trailing shield 17 and the side shield 16. The front-most end position of the insulating layer 20 is the throat height zero position TP as described above, and the distance between the throat height zero position TP and the ABS 220 is the throat height TH. The insulating layer 20 is composed of a non-magnetic insulating material such as alumina. Note that in FIG. 3 and FIG. 4, a case where the throat height zero position TP is coincident with the flare point FP is illustrated.

The thin film coil 22 generates magnetic flux for recording, and in the thin film coil 22, current flows in a direction opposite to that of the thin film coil 10. Incidentally, the detailed configuration of the thin film coil 22 is the same as that of the thin film coil 10, for example. In addition, instead of the thin film coils 10 and 22 with a spiral configuration winding in the stacking plane as described above, a helical coil with a configuration winding around the main magnetic-pole layer 14 and the auxiliary magnetic-pole layer 19 in Y-axis direction may be employed.

The insulating layers 21 and 23 electrically separate the thin film coil 22 from other nearby devices, and are linked with the insulating layer 20. The insulating layer 21 is composed of a non-magnetic insulating material same as that of the insulating layers 12 and 13, and the insulating layer 23 is composed of a non-magnetic insulating material same as that of the insulating layer 11. The front-most end of each of the insulating layers 21 and 23 are recessed from the front-most end of the insulating layer 20, for example.

The return yoke layer 24 mainly takes in magnetic flux returning from a recording medium 40 to the write head section 100B, and circulates the magnetic flux therebetween. The circulation function for magnetic flux is served by not only the return yoke layer 24 but also the side shield 16 and the trailing shield 17 as write shields, in some cases. The return yoke layer 24 is positioned on the trailing side of the side shield 16, the trailing shield 17, and the auxiliary magnetic-pole layer 19, and extends backward from the ABS 220 as an origin. The return yoke layer 24 is linked with the trailing shield 17 on the front side, and is linked with the auxiliary magnetic-pole layer 19 at the back gap BG on the rear side. In addition, the return yoke layer 24 is, for example, composed of a magnetic material same as that of the main magnetic-pole layer 14, and has a rectangular planar shape with the width W3 as illustrated in FIG. 4. Note that the return yoke layer 24 may be composed of a magnetic material different from that of the main magnetic-pole layer 14.

[Configuration of Main Part of Magnetic Read Write Head]

Figure 6:
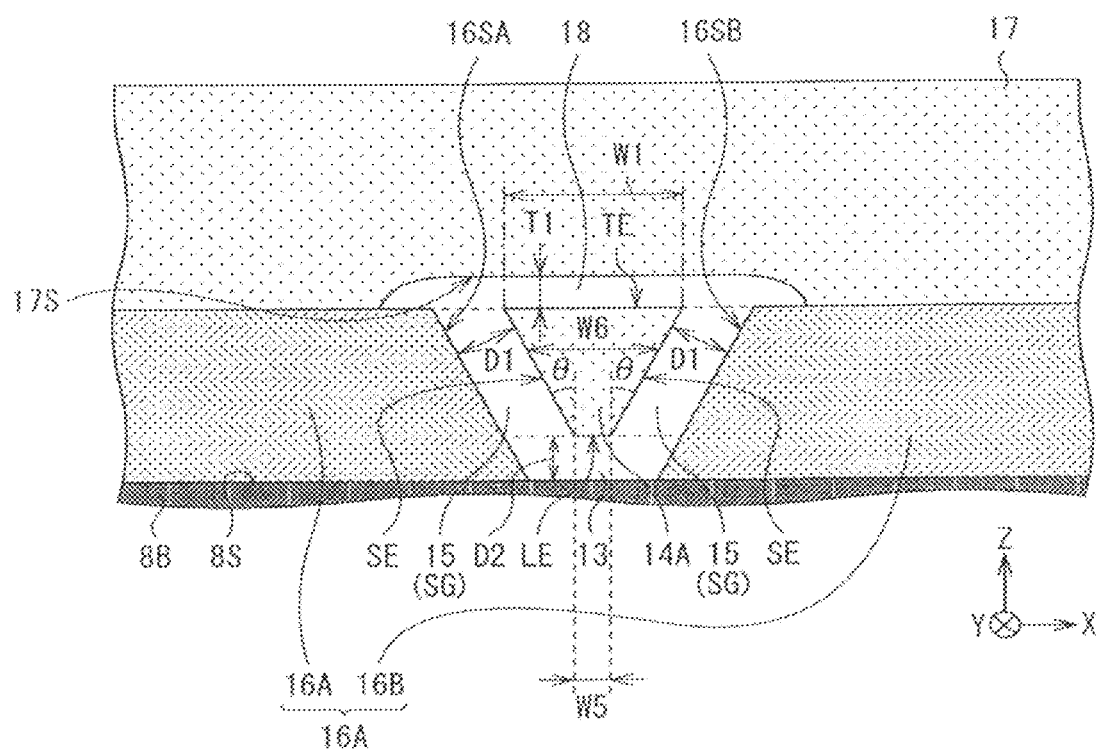
FIG. 6 is an enlarged plane view illustrating a configuration of a main part on an end surface in an ABS of the magnetic read write head illustrated in FIG. 2.

Next, a configuration of a main part of the magnetic read write head 212 will be described in detail with referring to FIG. 6: FIG. 6 illustrates a configuration of an end surface in the ABS 220 of the main part of the magnetic read write head 212. Incidentally, in FIG. 6, for the sake of improving visibility between components, components made of a constituent material other than the insulating materials are hatched.

The leading shield 8B, the insulating layer 13 as the leading gap, the front end portion 14A, the side gap 15, the side shields 16A and 16B, the trailing gap 18, and the trailing shield 17 each have an end surface exposed to the ABS 220. The phrase "each have an end surface exposed to the ABS 220" means that the end surface of each of the above-described components is included in the ABS 220.

The end surface of the front end portion 14A on the ABS 220 has a width on the trailing side wider than that on the leading side. Specifically, the end surface of the front end portion 14A has an end edge (trailing edge TE) positioned on the trailing side, an end edge (leading edge LE) positioned on the leading side, and two end edges (side edges SE) positioned therebetween. Therefore, the end surface of the front end portion 14A has a shape in which the width W1 of the trailing edge TE is larger than the width W5 of the leading edge LE. The trailing edge TE is a substantial recording point in the front end portion 14A, and the width W1 thereof is, for example, equal to or smaller than 0.2 μm. Note that the side edges SE may have a straight line shape, bended or curved shape, or combination thereof.

On the end surface of the front end portion 14A, for example, when the width W1 or W5 is compared with the width W6 at an arbitrary position between the trailing edge TE and the leading edge LE, W1>W5 and W1≥W6 are satisfied. In this case, the width W5 may be larger than zero, or may be substantially zero. The case where the width W5 is larger than zero means that the shape of the end surface is a shape including the leading edge LE as one side. On the other hand, the case where the width W5 is substantially zero means that the shape of the end surface is a shape including the leading edge LE as a vertex of a corner.

In FIG. 6, a case where the shape of the end surface of the front end portion 14A has a trapezoid (an inverted trapezoid) including the trailing edge TE as an upper base (a long side) and the leading edge LE as an lower base (a short side) is illustrated as an example. Although a bevel angle θ (a tilt angle of the side edge SE with respect to Z direction) in this case is not specifically limited, the bevel angle θ is desirably equal to or larger than a skew angle. This is because the width of erase band on the magnetic disk 201 may be minimized.

The leading shield 8B, the side shields 16A and 16B, and the trailing shield 17 surround the front end portion 14A through the insulating layer 13, the side gap 15, and the trailing gap 18 from four sides, namely, the leading side, both sides in a cross track direction (X-axis direction), and the trailing side. The side shields 16A and 16B are in contact with the leading shield 8B, however, are separated from the trailing shield 17 by the trailing gap 18. The side shields 16A and 16B have surfaces 16SA and 16SB facing the side edge SE of the front end portion 14A, respectively.

In this case, the thickness D1 (minimum distance between a surface including the side edge SE of the front end portion 14A and surfaces 16SA and 16SB of the side shield 16) of the side gap 15 on the ABS 220 is uniform. In addition, the thickness D2 (minimum distance between a surface including the leading edge LE of the front end portion 14A and a surface 8S of the leading shield 8B) of the insulating layer 13 as the leading gap is equal to the thickness D1. In other words, a contour of the side shields 16A and 16B and the leading shield 8B formed by the surfaces 16SA and 16SB and the surface 8S has a conformal shape with respect to a contour of the front end portion 14A formed by the side edge SE and the leading edge LE. Incidentally, the thickness D1 of the side gap 15 and the thickness D2 of the insulating layer 13 are, for example, within a range of 0.02 μm to 0.15 μm.

Out of a surface 17S facing the front end portion 14A and the side shield 16 in the trailing shield 17, at least a region portion facing the front end portion 14A is desirably a plane. This is because the linearity of the shape of a recording bit obtained at recording (recording bit pattern) is secured, and therefore high track density and linear recording density are easily obtained.

The leading shield 8B, the side shield 16, and the trailing shield 17 may be composed of, for example, nicked iron alloy (NiFe), cobalt nickel iron alloy (CoNiFe), and cobalt iron alloy (CoFe), and saturation flux density of each region portion is adjusted by changing composition ratio of the alloys appropriately.

[Configuration of Magnetic Disk]

Figure 7:
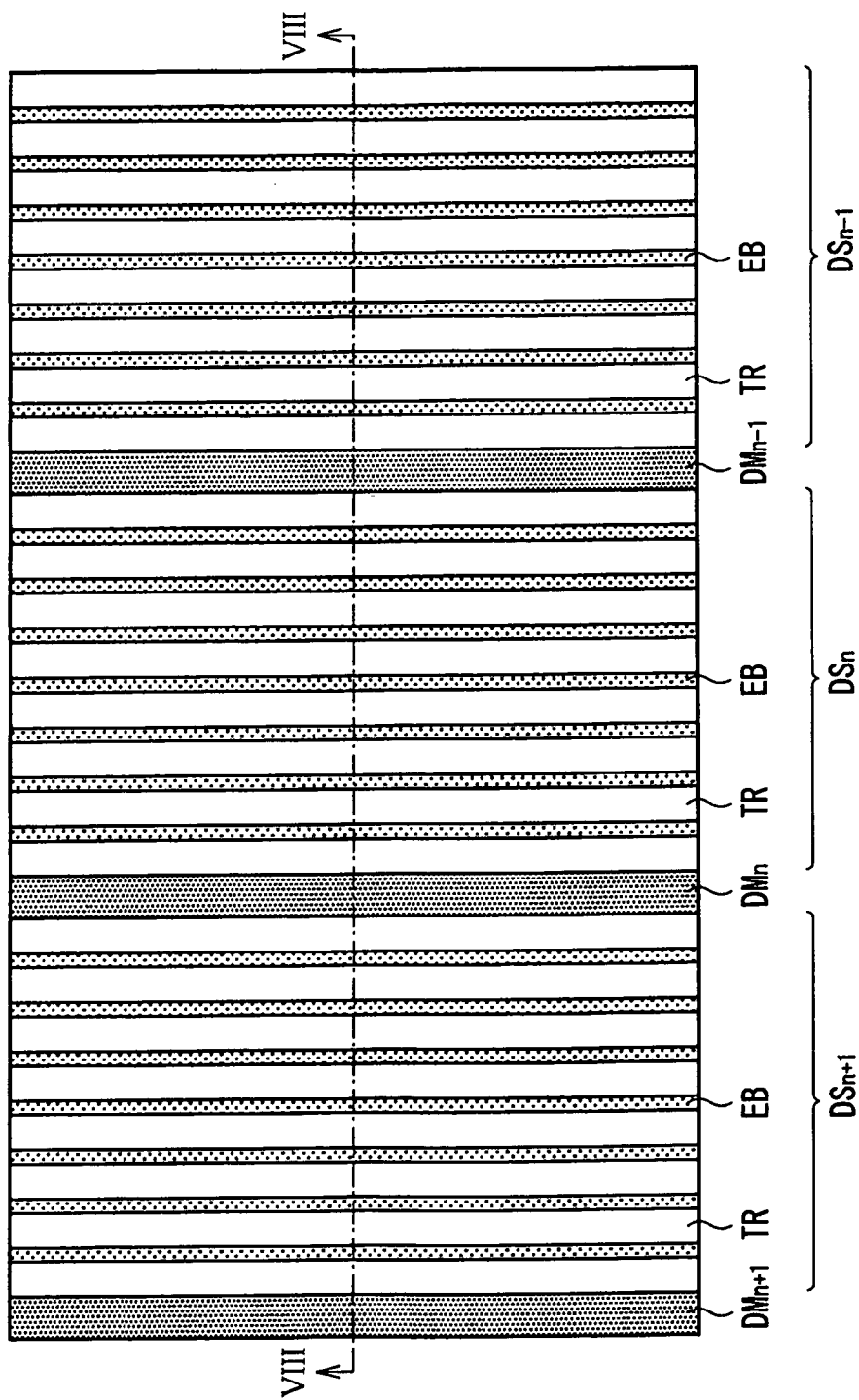
FIG. 7 is a plane view illustrating a surface configuration of the magnetic disk in an enlarged manner.

Next, the specific configuration of the magnetic disk 201 is described. FIG. 7 illustrates a plane configuration of a part of the surface of the magnetic disk 201 in an enlarged manner, and FIG. 8 illustrates a cross-sectional surface taken along a VIII-VIII line.

Figure 8:
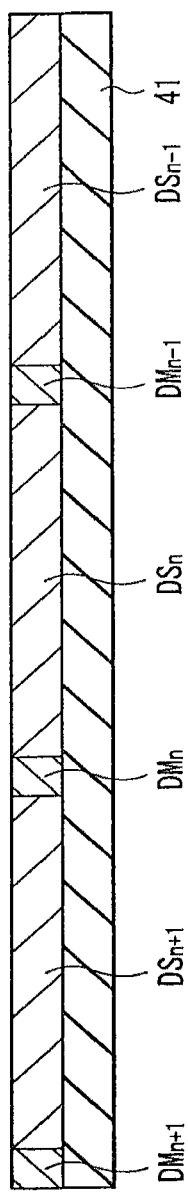
FIG. 8 is a sectional view illustrating a cross-sectional configuration of the magnetic disk in an enlarged manner.
Figure 9:
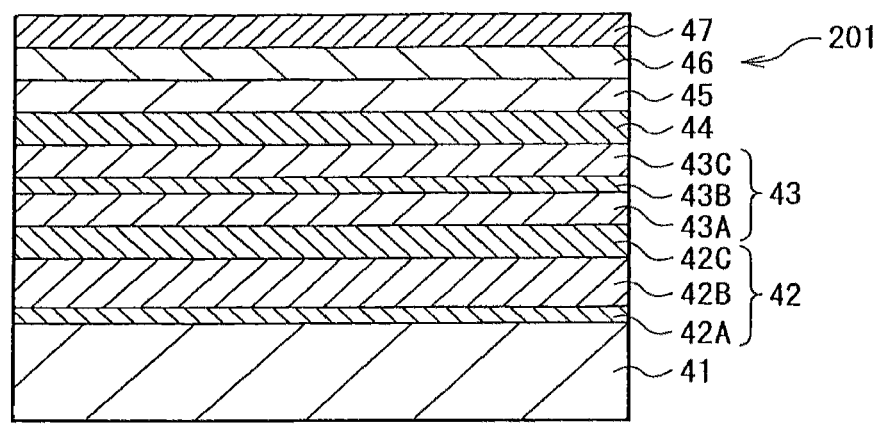
FIG. 9 is a sectional view illustrating a part of FIG. 8 in an enlarged manner.

As illustrated in FIG. 7 and FIG. 8, the magnetic disk 201 has, on a substrate 41, a plurality of data recording portions DS ( . . . , DSn−1, DSn, DSn+1, . . . ) separated from one another in a direction across write tracks (X-axis direction) by a write-exudation suppressing layer DM. In FIG. 9, a cross-sectional surface of a part of the data recording portion DS illustrated in FIG. 8 is illustrated in an enlarged manner. The data recording portion DS of the magnetic disk 201 is configured by stacking, on the substrate 41, for example, a flux pass layer 42, a soft magnetic backing layer 43, a non-magnetic layer 44, a hard magnetic recording layer 45, a protection layer 46, and a lubricating layer 47 in this order. The flux pass layer 42 functions as a flow pass of magnetic flux in the magnetic disk 201, and is configured by, for example, stacking non-magnetic layers 42A and 42C to sandwich a soft magnetic layer 42B. The soft magnetic backing layer 43 is configured by, for example, stacking soft magnetic layers 43A and 43C to sandwich a non magnetic layer 43B. The hard magnetic recording layer 45 is magnetized (information is magnetically recorded) by recording magnetic field.

The substrate 41 is an aluminum disk subjected to nickel-phosphorus (NiP) plating, and has an arbitrary thickness. In the flux pass layer 42, for example, the non-magnetic layer 42A is composed of titanium (Ti: approximately 1 nm thickness), the soft magnetic layer 42B is composed of cobalt nickel iron alloy (CoNiFe: approximately 100 nm to 200 nm thickness), and the non-magnetic layer 42C is composed of nickel phosphorus (approximately 100 nm thickness). The flux pass layer 42 has permeability higher than that of the soft magnetic backing layer 43. This is because the magnetic filed (recording magnetic field) from the magnetic read write head is strongly drawn in the magnetic disk 201 so that the recording capability is improved. Moreover, this is because the flux pass layer 42 is separated from the hard magnetic recording layer 45 and has a small magnetic interaction with the hard magnetic recording layer 45 so that the concern of the recording instability (for example, erasure of adjacent tracks) is reduced. In the soft magnetic backing layer 43, for example, the soft magnetic layer 43A is composed of a boride alloy including iron, cobalt, zirconium, and tantalum (FeCoZrTaB: approximately 50 nm thickness), the non-magnetic layer 43B is composed of ruthenium (Ru: approximately 0.8 nm thickness), and the soft magnetic layer 43C is composed of a boride alloy including iron, cobalt, zirconium, and tantalum (approximately 50 nm thickness). The non-magnetic layer 44 is composed of, for example, a mixture (approximately 30 nm thickness) of ruthenium chromium alloy (RuCr) and silicon oxide ($SiO_2$). The hard magnetic recording layer 45 is composed of, for example, a mixture (approximately 25 nm thickness) of cobalt platinum chromium alloy (CoPtCr) and silicon oxide. The protection layer 46 is composed of, for example, carbon (approximately 2 nm thickness). However, the cross-sectional configuration of the magnetic disk 201 is not necessarily limited to the above-described configuration.

The write-exudation suppressing layer DM is composed of a high magnetic material having coercivity higher than that of the hard magnetic recording layer 45, or a non-magnetic material, and is a portion not magnetized by recording magnetic field. The high magnetic material composing the write-exudation suppressing layer DM includes CoPt, CoCrPt, FePt, $CoPt.SiO_2$, $CoCrPt.SiO_2$, $FePt.SiO_2$. As the non-magnetic material, a material non-magnetized by ion-implanting other elements such as silicon (Si), indium (In), boron (B), phosphorus (P), carbon (C), and fluorine (F), into the above-described high magnetic material, and oxide materials such as carbon (C), $SiO_2$, $Al_2O_3$, $TiO_2$, and $Ti_2O_3$. In each of the data recording portions DS, a plurality of write tracks TR is formed. The write track TR is formed along a trail of the main magnetic-pole layer 14 (front end portion 14A) passing on the surface of the magnetic disk 201 while emitting recording magnetic filed at the time of recording processing by the magnetic read write device. Note that between the write tracks TR, a region called an erase band EB in which instability of a magnetization direction is large (a region in which variation of a magnetization direction is large) is formed. The erase band EB is formed corresponding to a region through which the both ends of front end portion 14A in the width direction pass at recording operation. Since the erase band EB has large variation of the magnetization and lacks reliability, it is not normally used as data.

The magnetic disk 201 is a magnetic recording medium for shingle write method, and the width $W_{TR}$ of each write track TR is narrower than the width W1 of the trailing edge TE of the front end portion 14A (for example, $W_{TR}=0.5*W1$).

[Operation of Magnetic Read Write Head]

The magnetic read write head is operated as follows.

When data is recorded on the magnetic disk 201, first, the spindle motor 205 is driven by a signal from the control section 209 to rotate the magnetic disk 201 (first step). After that, the driving section 206 is driven by a signal from the control section 209 to rotate the arm 204 around the fixed shaft 207, and then the slider 203A is moved above the surface of the magnetic disk 201 to be in a load state. Therefore, the magnetic head slider 202 is floated over the surface of the magnetic disk 201. Further, the control section 209 allows a current to flow through the thin film coil 22 of the write head section 100B to generate magnetic flux J for recording (refer to FIG. 5). The magnetic flux J is contained in the main magnetic-pole layer 14 and the auxiliary magnetic-pole layer 19, and then flows through inside of the magnetic-pole layer 14 toward the front end portion 14A. The magnetic flux J is eventually condensed in the vicinity of the trailing edge TE because the magnetic flux J is narrowed down at the flare point FP. When the magnetic flux J is emitted to outside to generate recording magnetic field, the hard magnetic recording layer 45 in a region applied with the recording magnetic field is magnetized, and data is magnetically recorded on the magnetic disk 201. At this time, while the arm 204 is rotated by a signal from the control section 209, and the magnetic read write head 212 is allowed to travel in a direction toward an inner write track from an outer write track with respect to the magnetic disk 201, the above-described recording processing is performed (second step).

In the magnetic read write head 212, current flows through the thin film coils 10 and 22 in opposite direction to each other so that magnetic flux is generated in the thin film coils 10 and 22 in opposite direction to each other. Specifically, the magnetic flux for recording is generated toward the leading side in the thin film coil 22, whereas the magnetic flux for preventing leakage is generated toward the trailing side in the thin film coil 10. Accordingly, the magnetic flux for recording is less likely to leak into the read head section 100A, and therefore the detection accuracy in the MR element 6 is prevented from being reduced. In addition, unnecessary magnetic field caused by the fact that the magnetic flux for recording is drawn in the lower lead shield 3 and the upper lead shield 5 is generated, and unintentional erasure of information recorded in the magnetic disk 201 is suppressed by the unnecessary magnetic field.

Moreover, when the magnetic flux J is emitted from the front end portion 14A, a part of the magnetic flux J is drawn into the trailing shield 17, the side shields 16A and 16B, and the leading shield 8B so that spread of the recording magnetic filed is suppressed and the gradient of the recording magnetic field is increased. The magnetic flux J drawn into the trailing shield 17 and the side shields 16A and 16B is resupplied to the main magnetic-pole layer 14 through the return yoke layer 24.

The magnetic flux J emitted from the main magnetic-pole layer 14 toward the magnetic disk 201 magnetizes the hard magnetic recording layer 45, then returns to the return yoke layer 24 through the flux pass layer 42, and is resupplied to the main magnetic-pole layer 14. Consequently, the magnetic flux J is cycled between the write head section 100B and the magnetic disk 201 to construct a magnetic circuit.

Figure 10:
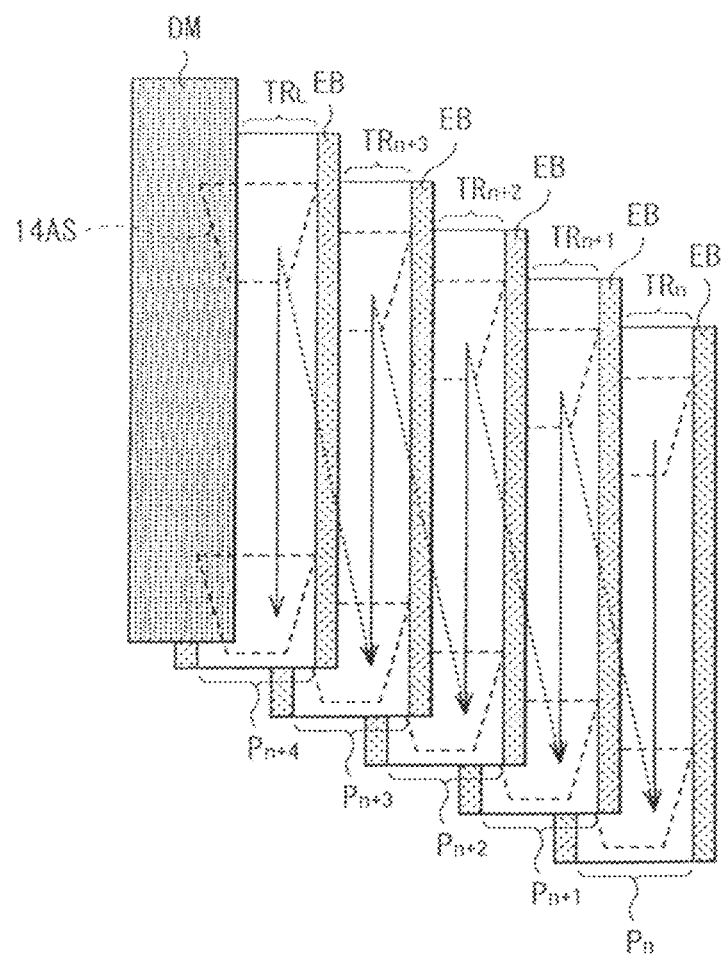
FIG. 10 is a conceptual diagram for describing a magnetic recording method with use of the magnetic recording/reproducing device in FIG. 1.

The magnetic disk device employs a shingle write method, and in the second step, the main magnetic-pole layer 14 is allowed to pass on the surface of the magnetic disk 201 so as to be overlapped with a part of a region where data has been recorded. When recording is performed to a final write track TR of the data recording portions DS, a part of the main magnetic-pole layer 14 is passed on the write-exudation suppressing layer DM. For example, as illustrated in FIG. 10, a subsequent passage region Pn+1 is formed so as to overlap with a part of a passage region Pn where the front end portion 14A has passed to perform magnetic recording on the surface of the magnetic disk 201. In other words, recording operation is performed so that a part of a previous passage region Pn is rewritten (overwritten) with a subsequent passage region Pn+1. Therefore, a portion obtained by removing the erase band EB corresponding to a region where the vicinity of the end edge of the front end portion 14A passes from a portion corresponding to a gap between the previous passage region Pn and the subsequent passage region Pn+1 is a write track TRn obtained eventually. Note that in FIG. 10, right side of the drawing corresponds to an outer periphery side of the magnetic disk 201, and left side corresponds to an inner periphery side of the magnetic disk 201. In addition, reference numeral 14AS in FIG. 10 denotes projection of the front end portion 14A projected on the surface of the magnetic disk 201.

On the other hand, when data is read from the magnetic disk 201, a sense current is supplied to the MR element 6 of the read head section 100A. The resistance value of the MR element 6 changes depending on signal magnetic field for reading in the magnetic disk 201. Since the resistance change is detected as voltage change, information recorded in the magnetic disk 201 is magnetically reproduced.

[Functions and Effects of Magnetic Disk Device]

In the magnetic disk device of the embodiment, when data is recorded on the magnetic disk 2, the magnetic read write head 212 is allowed to travel only in a direction from an outer write track toward an inner write track, across write tracks in the magnetic disk 201. Therefore, compared with the case where the magnetic read write head 212 is allowed to travel bi-directionally, format efficiency may be improved. Moreover, in the magnetic read write head 212, the distance between the front end portion 14A of the main magnetic-pole layer 14, the side shields 16A and 16B, and the leading shield 8B is maintained uniform with the gap layer therebetween. Therefore, the width of the erase band EB may be minimized, and surface recording density of the magnetic disk 201 may be improved without reducing an effective write track width.

Figure 11:
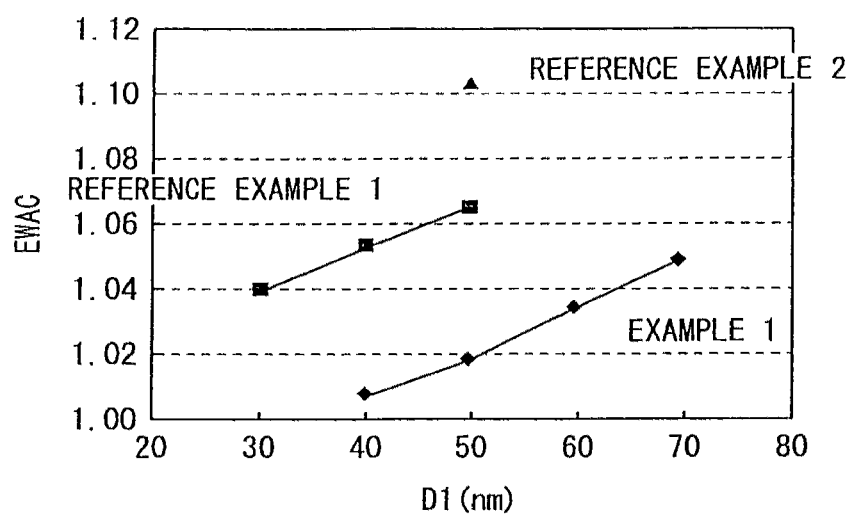
FIG. 11 is a characteristic diagram illustrating change in spread of recording magnetic field in a track width direction on the end surface exposed to the ABS, caused by shape of a magnetic pole and a side shield.
Figure 12A:
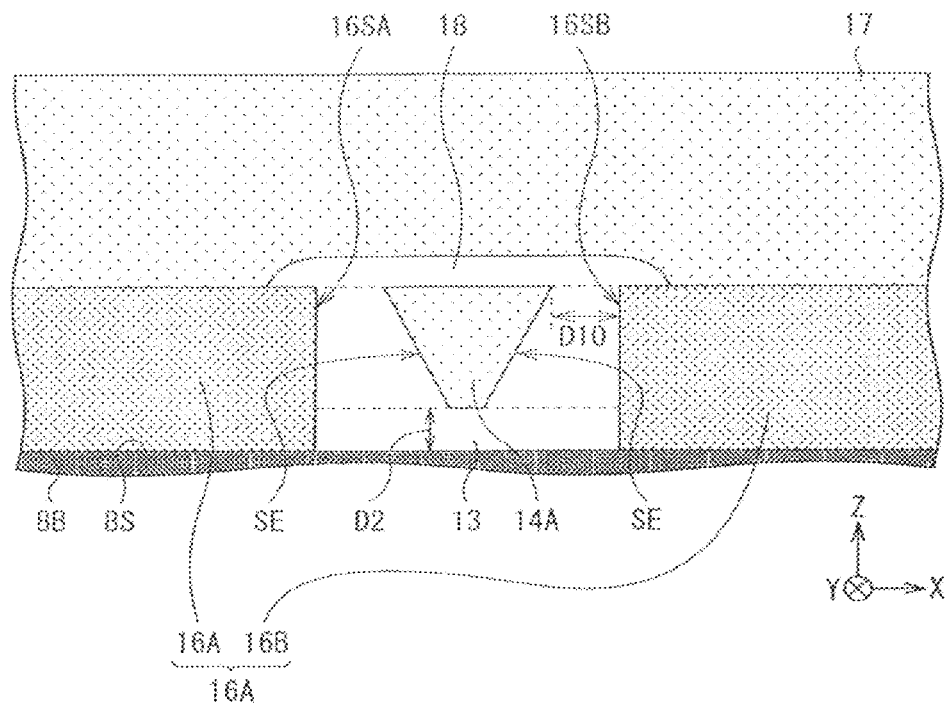
FIG. 12A is an enlarged plane view illustrating a configuration of a main part of an end surface in an ABS of a magnetic read write head according to a reference example 1.

FIG. 11 illustrates a relationship between the thickness D1 of the side gap 15 and EWAC, when the relative angle between the side edge SE of the front end portion 14A and the surfaces 16SA and 16SB of the side shield 16 is changed. EWAC is a parameter representing spread of recording magnetic field in the track width direction in the vicinity of the trailing edge TE, and represents a ratio defined with reference to EWAC at the time of D1=50 nm in an example 1. The example 1 is a case where in the magnetic read write head 212 of the embodiment illustrated in FIG. 6 and the like, the bevel angle θ is 14°, and when the side edge SE and the surfaces 16SA and 16SB of the side shield 16 are parallel to each other, the thickness D1 of the side gap 15 is changed within a range of 40 to 70 nm. Note that the thickness D2 of the insulating layer 13 is changed according to the thickness D1. In a reference example 1, the same configuration as in the example 1 is applied except that the surfaces 16SA and 16SB of the side shield 16 are parallel to Z-axis as illustrated in FIG. 12A. In this case, a minimum distance D10 between the side edge SE and the surfaces 16SA and 16SB of the side shield 16 is changed within a range of 30 to 50 nm. In addition, the thickness D2 is set within a range of 54 to 74 nm. In a reference example 2, the same configuration as in the example 1 is applied except that the surfaces 16SA and 16SB of the side shield 16 are inclined by 10° to opposite side to the side edge SE with respect to Z-axis. In this case, a minimum distance D20 between the side edge SE and the surfaces 16SA and 16SB of the side shield 16 is set to 50 nm. In addition, the thickness D2 is set to 100 nm.

As illustrated in FIG. 11, it is found that in the example 1, EWAC tends to decrease compared with the reference examples 1 and 2. In other words, it is confirmed that by maintaining the distance between the side shields 16A and 16B and the leading shield 8B uniform, the width of the erase band EB is minimized, and the surface recording density of the magnetic disk 201 is advantageously improved.

Moreover, in the magnetic disk device, the magnetic disk 201 is divided into a plurality of data recording portions DS each including a plurality of write tracks TR. Therefore, data rewriting processing is possible for each data recording portion DS. As a result, compared with a case where the magnetic disk 201 has only one data recording portion, time taken for data rewriting processing may be significantly reduced.

Furthermore, in the direction across write tracks (X-axis direction), the write-exudation suppressing layer DM is respectively provided between the plurality of data recording portions DS. Accordingly, an erase band EB between the data recording portions DS is prevented from occurring, and the mutual distance between the data recording portions DS may be reduced.

Figure 13:
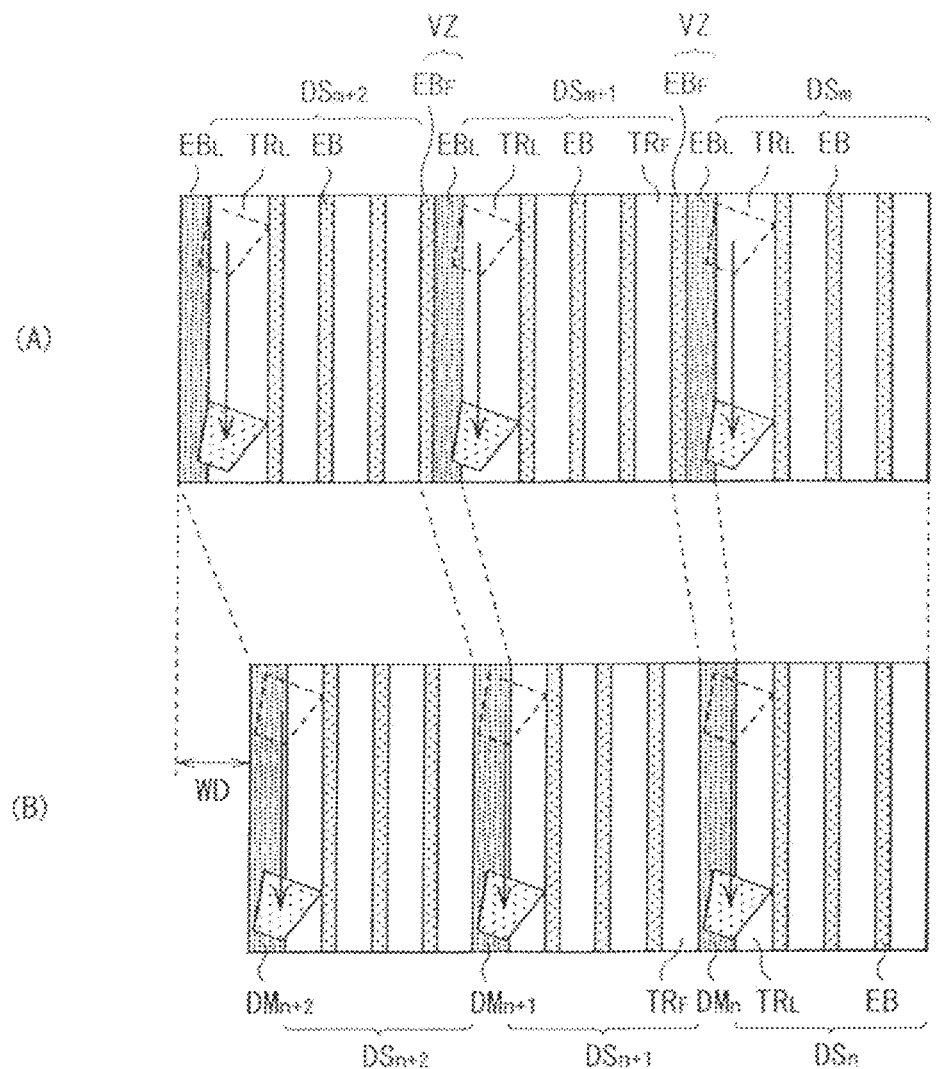
FIG. 13A is a plane view for describing a function of a magnetic disk according to a reference example 3.
FIG. 13B is a plane view for describing a function of a magnetic disk of the embodiment.

In other words, in the case where the write-exudation suppressing layer DM is not provided as in a reference example 3 illustrated in (A) of FIG. 13, for example, an erase band $EB_L$ is inevitably formed outside of the final write track $TR_L$ in the data recording portion $DS_m$ subjected to data rewriting processing. The width of the erase band $EB_L$ is increased according to a skew angle (with increasing a skew angle). In addition, an erase band $EB_F$ of the first write track $TR_F$ in the adjacent data recording portion $DS_{m+1}$ is formed so as to be adjacent to the erase band $EB_L$ in the data recording portion $DS_m$. Therefore, a gap region VZ is formed between the data recording portion $DS_m$ and the data recording portion $DS_{m+1}$. At this time, the large width of the gap region VZ is necessarily secured so that data recorded in the first write track $TR_F$ in the data recording portion $DS_{m+1}$ is not magnetically affected from the erase band $EB_L$ (so that instability of the magnetization direction is not propagated), when the subsequent rewriting processing is performed to the data recording portion $DS_m$. Moreover, in the reference example 3 in (A) of FIG. 13, the width of the final write track $TR_L$ becomes larger than the width of the other write tracks TR. These factors cause reduction in recording density of the whole magnetic disk 201.

Therefore, in the embodiment, as illustrated in (B) of FIG. 13, a part of the final write track $TR_L$ and the gap region VZ (erase bands $EB_L$ and $EB_F$) in (A) of FIG. 13 are rewritten with the write-exudation suppressing layer DM. Accordingly, the width of the write track $TR_L$ is narrowed in (B) of FIG. 13. In addition, magnetic information is not recorded (magnetized) in the write-exudation suppressing layer DM. Therefore, erase bands $EB_L$ and $EB_F$ are not formed in (B) of FIG. 13, and the width of the write-exudation suppressing layer DM is smaller than total width of the erase band $EB_L$ and the erase band $EB_F$. As a result, arrangement pitch of the data recording portions DS may be reduced. Consequently, in the embodiment, the total width of the three adjacent data recording portions $DS_n$, $DS_{n+1}$, and $DS_{n+2}$ illustrated in (B) of FIG. 13 becomes smaller by an amount of a width WD than the total width of the three adjacent data recording portions $DS_m$, $DS_{m+1}$, and $DS_{m+2}$ in the reference example 3 illustrated in (A) of FIG. 13. Note that in the embodiment in (B) of FIG. 11, when compared with the reference example 3 in (A) of FIG. 13, for example, in the case where the skew angle is 14°, each of the data recording portions DS may be narrowed by approximately 30 to 40 nm (similar extent to the width of the erase band $EB_F$). By providing the write-exudation suppressing layer DM in this way, even in the case where the mutual distance between the data recording portions DS is reduced, at the time of data rewriting processing, magnetic mutual interaction between the adjacent data recording portions DS is prevented, and the favorable recording state in each data recording portion DS is maintained.

Figure 12B:
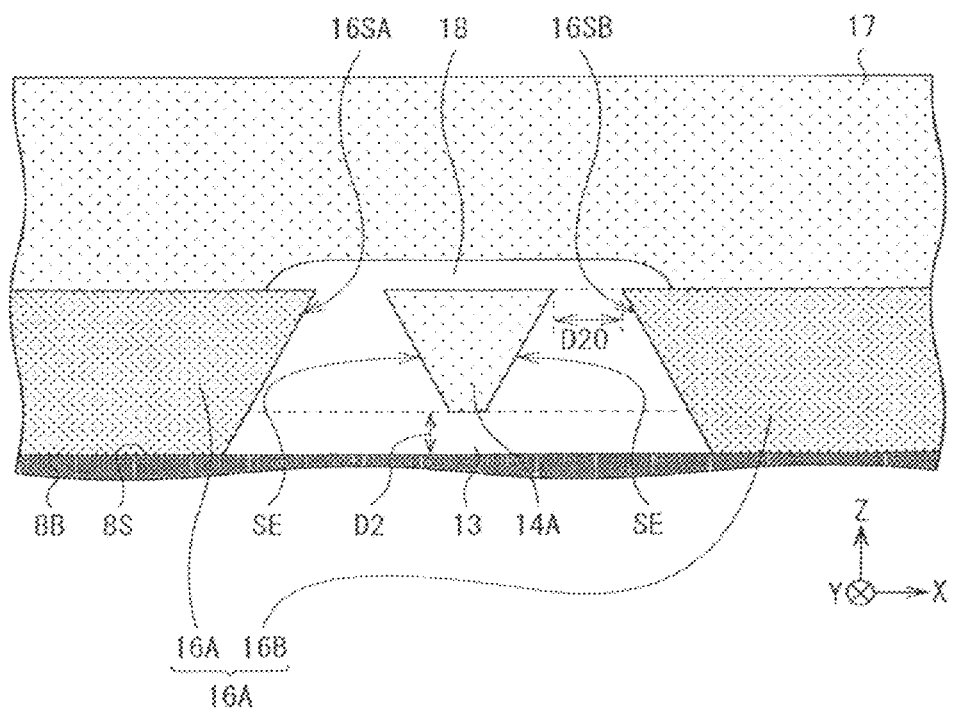
FIG. 12B is an enlarged plane view illustrating a configuration of a main part of an end surface in an ABS of a magnetic read write head according to a reference example 2.
Figure 14:
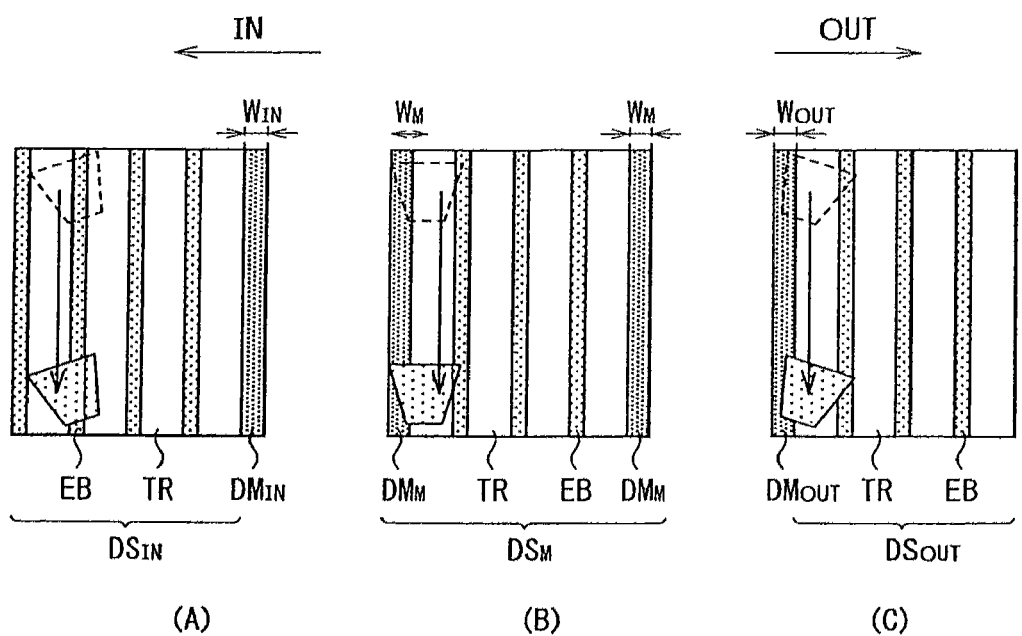
FIG. 14 is another plane view illustrating a surface configuration of the magnetic disk of the embodiment in an enlarged manner.

Incidentally, as illustrated in (A) to (C) of FIG. 14, the width $W_{DM}$ of the write-exudation suppressing layer DM is different depending on a position in the magnetic disk 201. This is because a tilt angle (so-called a skew angle) in a reference direction (Z-axis direction) of the main magnetic-pole layer 14 with respect to a tangent of the write track TR is different from one another in an inner region, an intermediate region, and an outer region, in a radial direction of the magnetic disk 201 due to a reason in configuration of the magnetic disk device, and therefore the width $W_{DM}$ is allowed to correspond to the difference of the tilt angle. For example, in FIG. 14, (A), (B), and (C) illustrate a data recording portion $DS_{IN}$ in an inner region in a radial direction of the magnetic disk 201, a data recording portion $DS_{TM}$ in an intermediate region, and a data recording region $DS_{OUT}$ in an outer region, respectively. Note that in FIG. 12, the case where the skew angle is set to minimum (0°) in the intermediate region of the magnetic disk 201, and (the absolute value of) the skew angle is set to be larger toward the inner periphery or the outer periphery is illustrated. In this case, the width of the erase band $EB_L$ (refer to (A) of FIG. 13) without the write-exudation suppressing layer DM is increased with increasing the skew angle. The width of the erase band $EB_L$ is approximately 0.01 to 0.015 μm when the skew angle is 0°, whereas is increased to approximately 0.02 to 0.04 μm when the skew angle is 14°. Therefore, to respond to this situation, as illustrated in (A) to (C) of FIG. 14, the widths $W_{IN}$ and $W_{OUT}$ of the write-exudation suppressing layer DM in the inner region and in the outer region are larger than the width $W_M$ of the write-exudation suppressing layer DM in the intermediate region. In other words, the width $W_{DM}$ of the write-exudation suppressing layer DM is a maximum in an innermost periphery portion or in an outermost periphery portion of the magnetic disk 201.

From such a reason, reduction of the arrangement pitch of the data recording portions DS is particularly effectively performed in a region where the skew angle on the magnetic disk 201 is large. Note that the maximum value of the skew angle is set to be equal to or smaller than the bevel angle θ (FIG. 5) so that the width of the erase band EB is further decreased. This is because if the skew angle is larger than the bevel angle θ, at the data recording, the side edge SE of the front end portion 14A or the surfaces 16SA and 16SB of the side shield 16 affect the magnetization direction of the hard magnetic recording layer 45 in the magnetic disk 201.

Moreover, the thickness D1 (FIG. 5) of the side gap 15 is most desirably in the same range as the pitch of the write tracks TR (namely, total width of the width of one erase band EB (FIG. 7) and the width of one write track TR (FIG. 7)) aligned in the radial direction of the magnetic disk 201. This is because if the thickness D1 is excessively larger than the pitch of the write tracks TR, the recording magnetic field from the main magnetic-pole layer 14 may adversely affect the recording state of the adjacent tracks. On the other hand, this is because if the thickness D1 is excessively small, the recording magnetic field from the main magnetic-pole layer 14 is reduced which causes lowering of the write capability to the magnetic disk 201. Favorable recording property is advantageously secured by setting the thickness D1 of the side gap 15 to be in the same range as the pitch of the write tracks TR.

As described above, in the embodiment, the plurality of data recording portions DS are provided in the magnetic disk, and the data recording portions DS are separated from one another by the write-exudation suppressing layer DM. Therefore, while improving recording density, data rewriting processing may be favorably performed in a short time for each data recording portion DS.

Figure 15:
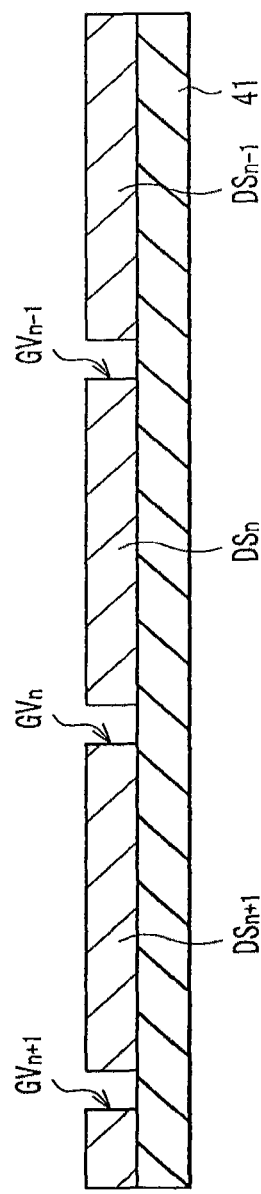
FIG. 15 is a sectional view illustrating a cross-sectional configuration of a magnetic disk according to a first modification.

Incidentally, the invention is not limited to the above-described embodiment, and various modifications may be made. Specifically, in the above-described embodiment, for example, a write-exudation suppressing layer as a portion not magnetized by recording magnetic field is provided between data recording portions on the surface of a magnetic disk. However, the invention is not limited thereto. In other words, as illustrated in FIG. 15, for example, a groove (a concave section) GV may be provided between the data recording portions, instead of the above-described write-exudation suppressing layer. In this case, the groove GV functions as a portion not magnetized by the recording magnetic field (write-exudation suppressing section). In addition, the invention is not limited to a magnetic recording device or a magnetic recording method which use a magnetic disk (a recording medium) including such a write-exudation suppressing section. In other words, the invention exerts effects of improving recording density and promoting efficiency of data rewriting processing when magnetic information is recorded on a magnetic disk which is not provided with a write-exudation suppressing layer between data recording portions. Incidentally, when a magnetic disk provided with a write-exudation suppressing section is used, recording density may be further improved.

Moreover, in the above-described magnetic disk device, when data is recorded on the magnetic disk 2, the magnetic read write head 212 is allowed to travel in a direction from an outer write track toward an inner write track, across write tracks in the magnetic disk 201. However, the magnetic read write head 212 may be traveled in the opposite direction. In other words, the magnetic read write head 212 is allowed to travel in a direction from an inner write track toward an outer write track, across write tracks in the magnetic disk 201.

Figure 16:
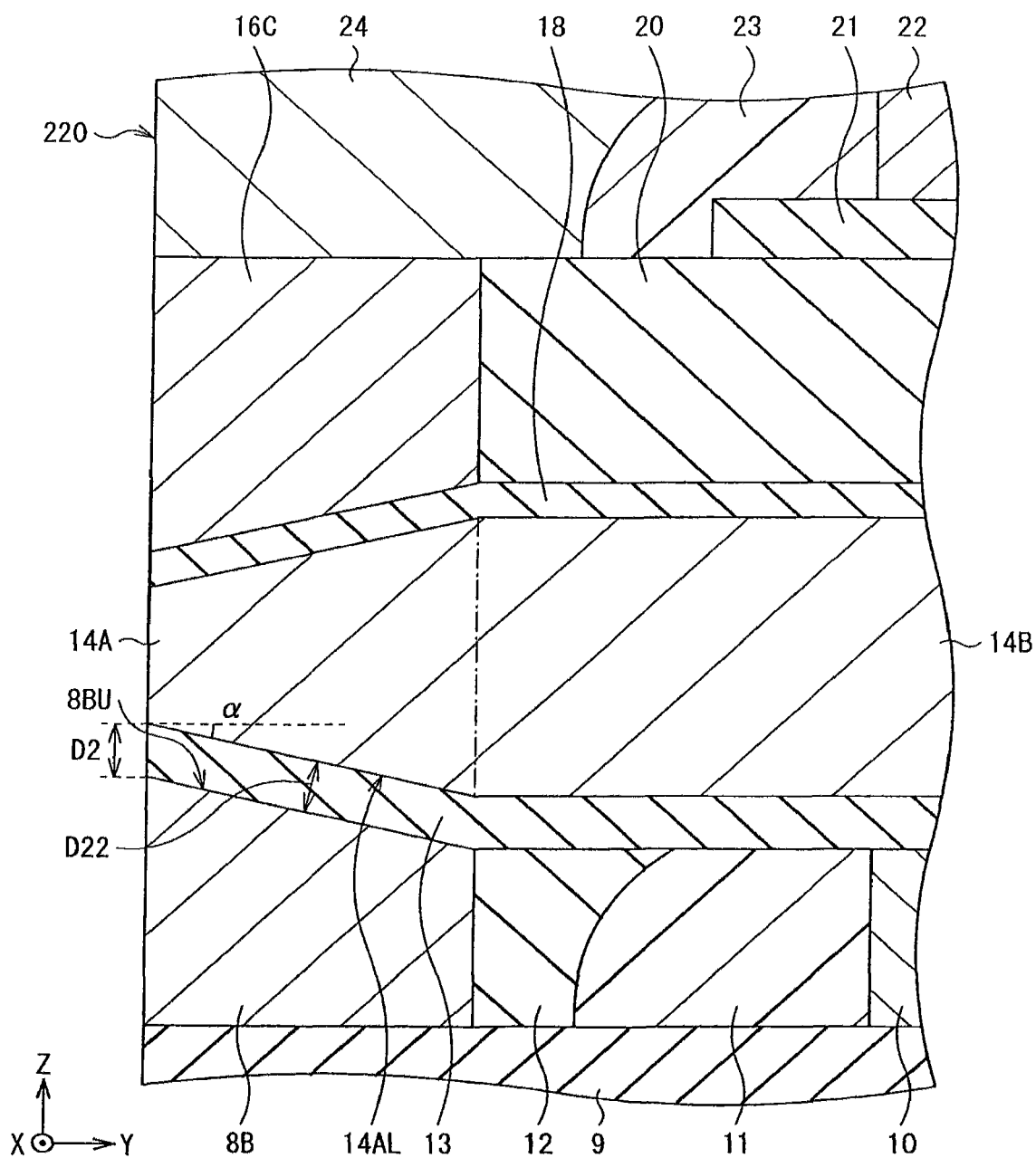
FIG. 16 is a sectional view illustrating a configuration of a magnetic read write head according to a second modification.

Furthermore, in the above-described magnetic disk device, although the bottom surface of the front end portion 14A of the main magnetic-pole layer 14 is set to a plane orthogonal to the ABS, the invention is not limited thereto. As illustrated in FIG. 16, for example, the front end portion 14A may include a bottom surface 14AL which is inclined to make an angle α with respect to a direction (Y-axis direction) orthogonal to the ABS 220. Here, a top surface 8BU of the leading shield 8B facing the inclined bottom surface 14AL is also inclined with respect to the ABS 220 so as to be parallel to the bottom surface 14AL. In this case, a thickness D22 of the insulating layer 13 defined by a minimum distance between the bottom surface 14AL and the top surface 8BU is equal to the thickness D1. In such a configuration, the width of the erase band EB may be minimized, and surface recording density of the magnetic disk may be improved without reducing an effective write track width.

The correspondence relationship between the reference numerals and the components of the embodiment is collectively illustrated here.

1 . . . substrate, 2, 9, 11 to 13, 20, 21, 23 . . . insulating layers, 3 . . . lower lead shield, 4 . . . shield gap, 5 . . . upper lead shield, 6 . . . magneto-resistive effect (MR) element, 7 . . . separation layer, 8A, 8C . . . magnetic layers, 8B . . . leading shield, 10, 22 . . . thin film coils, 14 . . . main magnetic-pole layer, 14A . . . front end portion, 14B . . . rear end portion, 15 . . . side gap (SG), 16 . . . side shield, 17 . . . trailing shield, 18 . . . trailing gap, 19 . . . auxiliary magnetic-pole layer, 24 . . . return yoke layer, 25 . . . over coat layer, 100A . . . read head section, 100B . . . write head section, 200 . . . housing, 201 . . . magnetic disk, 202 . . . magnetic head slider, 203 . . . suspension, 204 . . . arm, 205 . . . spindle motor, 206 . . . driving section, 207 . . . fixed shaft, 208 . . . bearing, 209 . . . control section, 211 . . . substrate, 212 . . . magnetic read write head, 220 . . . ABS, DM . . . write-exudation suppressing layer, DS . . . data recording portion, TR . . . write track, EB . . . erase band.

What is claimed is:

1. A magnetic recording device comprising:
   a recording medium provided with a plurality of write tracks;
   a magnetic write head including a magnetic pole, side shields, and a leading shield, a distance from the magnetic pole to each of the side shields being maintained to be uniform with a gap layer between each side shield and the magnetic pole, a thickness of each gap layer being equal to a pitch of each write track of the plurality of write tracks, and a distance from the magnetic pole to the leading shield being maintained to be uniform with a leading gap layer therebetween; and
   a control section rotating the recording medium, and allowing magnetic information to be recorded on the recording medium while allowing the magnetic write head to travel in a direction from an inner write track toward an outer write track or from the outer write track toward the inner write track, across write tracks in the recording medium.

2. The magnetic recording device according to claim 1, wherein
   the control section allows the magnetic information to be recorded on the recording medium while allowing the magnetic write head to travel in the direction from the outer write track toward the inner write track.

3. The magnetic recording device according to claim 1, wherein
   the magnetic pole has a bevel angle equal to or larger than a skew angle.

4. The magnetic recording device according to claim 1, wherein a thickness of the leading gap layer is equal to the thickness of each gap layer.

5. A magnetic recording method comprising:
   a first step of rotating a magnetic recording medium provided with a plurality of write tracks; and
   a second step of recording information on a desired write track of the write tracks through allowing a magnetic write head to float over the magnetic recording medium and applying a recording magnetic field from the magnetic pole to the desired write track, the magnetic write head including a magnetic pole, side shields, and a leading shield, a distance from the magnetic pole to each of the side shields being maintained to be uniform with a gap layer between each side shield and the magnetic pole, a thickness of each gap layer being equal to a pitch of each write track of the plurality of write tracks, and a distance from the magnetic pole to the leading shield being maintained to be uniform with a leading gap layer therebetween, wherein
   in the second step, magnetic information is recorded on the recording medium while allowing the magnetic write head to travel in a direction from an inner write track toward an outer write track or from the outer write track toward the inner write track, across write tracks in the recording medium.

* * * * *